United States Patent
Xie et al.

(10) Patent No.: US 10,484,486 B2
(45) Date of Patent: Nov. 19, 2019

(54) CAPABILITY OPENING METHOD AND SYSTEM, AND CAPABILITY OPENING FUNCTION ENTITY

(71) Applicant: ZTE CORPORATION, Shenzhen, Guangdong (CN)

(72) Inventors: Baoguo Xie, Shenzhen (CN); Se Wu, Shenzhen (CN); Weibin Wang, Shenzhen (CN)

(73) Assignee: ZTE CORPORATION (CN)

(*) Notice: Subject to any disclaimer, the term of this patent is extended or adjusted under 35 U.S.C. 154(b) by 80 days.

(21) Appl. No.: 15/576,564

(22) PCT Filed: Jan. 18, 2016

(86) PCT No.: PCT/CN2016/071222
§ 371 (c)(1),
(2) Date: Nov. 22, 2017

(87) PCT Pub. No.: WO2016/188128
PCT Pub. Date: Dec. 1, 2016

(65) Prior Publication Data
US 2018/0152526 A1 May 31, 2018

(30) Foreign Application Priority Data
May 22, 2015 (CN) .......................... 2015 1 0267898

(51) Int. Cl.
*H04L 29/08* (2006.01)
*H04W 24/02* (2009.01)
(Continued)

(52) U.S. Cl.
CPC .............. *H04L 67/16* (2013.01); *H04L 67/20* (2013.01); *H04W 4/50* (2018.02); *H04W 16/00* (2013.01);
(Continued)

(58) Field of Classification Search
CPC ........ H04L 67/16; H04L 67/20; H04W 24/02; H04W 4/50; H04W 16/00; H04W 28/10; H04W 84/18
See application file for complete search history.

(56) References Cited

U.S. PATENT DOCUMENTS

2013/0070739 A1  3/2013 McCann
2014/0317261 A1  10/2014 Shatzkamer et al.
(Continued)

FOREIGN PATENT DOCUMENTS

CN  1889498 A    1/2007
CN  101056174 A  10/2007
(Continued)

OTHER PUBLICATIONS

International Search Report in international application No. PCT/CN2016/071222, dated Apr. 11, 2016.
(Continued)

*Primary Examiner* — Joseph E Dean, Jr.
(74) *Attorney, Agent, or Firm* — McDonald Hopkins LLC

(57) ABSTRACT

A capability opening method and system, and a capability opening functional entity. The method comprises: after receiving a requirement of a third party for a mobile network, acquiring current network information; based on the requirement and the current network information, creating private network networking information, wherein the private network networking information is used for instructing the creation of a private network and/or a private network element; and sending the private network networking information to a network arrangement functional entity. The technical solution of the present invention can solve the problem in the related art that capability opening is limited
(Continued)

only to the opening of a present network capability, but cannot provide additional services exceeding the present network capability.

18 Claims, 11 Drawing Sheets

(51) Int. Cl.
    *H04W 4/50* (2018.01)
    *H04W 28/10* (2009.01)
    *H04W 84/18* (2009.01)
    *H04W 16/00* (2009.01)

(52) U.S. Cl.
    CPC .......... *H04W 24/02* (2013.01); *H04W 28/10* (2013.01); *H04W 84/18* (2013.01)

(56) References Cited

U.S. PATENT DOCUMENTS

| | | | |
|---|---|---|---|
| 2014/0317293 A1 | 10/2014 | Shatzkamer | |
| 2015/0019746 A1 | 1/2015 | Shatzkamer et al. | |
| 2015/0113105 A1* | 4/2015 | Ackley | H04L 41/0806 709/220 |
| 2015/0304404 A1 | 10/2015 | Li et al. | |
| 2015/0358248 A1* | 12/2015 | Saha | H04L 43/0817 709/226 |
| 2016/0006606 A1 | 1/2016 | Zhu et al. | |
| 2016/0105332 A1* | 4/2016 | Xiang | H04L 41/5045 709/226 |

FOREIGN PATENT DOCUMENTS

| | | |
|---|---|---|
| CN | 102148828 A | 8/2011 |
| CN | 102299849 A | 12/2011 |
| CN | 102299919 A | 12/2011 |
| CN | 102340767 A | 2/2012 |
| CN | 102573112 A | 7/2012 |
| CN | 102883264 A | 1/2013 |
| CN | 102917019 A | 2/2013 |
| CN | 103392353 A | 11/2013 |
| CN | 103685194 A | 3/2014 |
| CN | 103686693 A | 3/2014 |
| CN | 103702352 A | 4/2014 |
| CN | 103702380 A | 4/2014 |
| CN | 104322039 A | 1/2015 |
| RU | 2284669 C2 | 9/2006 |
| WO | 2014117376 A1 | 8/2014 |

OTHER PUBLICATIONS

English Translation of the Written Opinion of the International Search Authority in international application No. PCT/CN2016/071222, dated Apr. 11, 2016.

Supplementary European Search Report in European application No. 16799017.5, dated Mar. 16, 2018.

China Mobile: "solution 3 Clarification ", 3GPP Draft; S2-150827 Solution 3 Clarification, 3rd Generation Partnership Project (3GPP), Mobile Competence Centre 650, Route Des Lucioles ; F-06921 Sophia-Anti Polis Cedex ; France vol. SA WG2, No. San Jose del Cabo, Mexico; Apr. 13, 2015-Apr. 17, 2015 Apr. 13, 2015 (Apr. 13, 2015), XP050942710, Retrieved from the Internet: URL:http://www.3gpp.org/ftp/Meetings_3GPP_SYNC/SA2/Docs/.

Alcatel-Lucent: "AESE—Solution 8 Evalua" 3GPP Draft; S2-150940 AESE PCR—Solution 8 Evaluation, 3rd Generation Partnership Project (3GPP), Mobile Competence Centre; 650, Route Des Lucioles; F-06921 Sophia-Antipolis Cedex ; France, vol. SA WG2, No. San Jose del Cabo, Mexico; Apr. 13, 2015-Apr. 17, 2015 Apr. 6, 2015 (Apr. 6, 2015), XP050962118, Retrieved from the Internet: URL:http://www.3gpp.org/ftp/tsg_sa/WG2_Arch/TSGS2_108_Los_Cabos/Docs/.

ZTE et al: "Identification and Discovery of Service Capabilities", 3GPP Draft; S2-143754 (WAS 3018,3476) AESE-Indentification (Cleanup), 3rd Generation Partnership Project (3GPP), Mobile Competence Centre; 650, Route Des Luciol, vol. SA WG2, No. Sapporo, Japan; Oct. 13, 2014-Oct. 17, 2014 Oct. 16, 2014 (Oct. 16, 2014), XP050891460, Retrieved from the Internet: URL:http://www.3gpp.org/ftp/tsg_sa/ WG2_Arch/TSGS2_105_Sapporo/Docs/.

\* cited by examiner

CAPABILITY OPENING METHOD AND SYSTEM, AND CAPABILITY OPENING FUNCTION ENTITY

TECHNICAL FIELD

The disclosure relates to the technical field of capability exposure, and particularly to a capability exposure method and system and a capability exposure function entity.

BACKGROUND

In the past more than 20 years, a mobile communication technology has been rapidly developed and brought enormous influence to people's lifestyles and work styles and each aspect of politics, economics and the like of the society. The human society enters the efficient information age, and service Application (APP) requirement of each aspect explosively grows, which brings great challenges to each aspect of frequency, technology, operation and the like of a future wireless mobile bandwidth system.

Along with enrichment of various Internet APPs, a third-party Service Provider (SP) has increasing requirements on information interaction and network personalization of a network operating company, and network capability exposure gradually becomes a mainstream of a future network technology. For example, there are part of delay-insensitive services in mobile services used by mobile individual users, industry users and SPs/Content Providers (CPs) at present, for example, services of software updating and downloading and music and video downloading, data traffic of these services is slightly high, and adopting normal data plans for transmission will cost more. In existing networks, a mobile data network presents the characteristic of obvious busyness and idleness non uniformity in terms of time and region, and there exist many idle resources in the network. A background traffic service may fully utilize these idle radio resources to make a network of an operating company fully utilized, simultaneously enable a user to enjoy very cheap traffic and make it possible for an SP/CP to distribute services and contents by virtue of low-cost background traffic channels, thereby promoting use of the user for mobile traffic and increasing data incomes of the operating company.

In the mobile Internet age, it has already been inevitable for operating companies to expose network capabilities. Over the years, pipeline resources and network advantages are always reasons why the operating companies keep core competitiveness. However, with the arrival of the 4th Generation (4G) and 5th Generation (5G) ages, rich Internet APPs gradually turn the operating companies into pure pipeline providers. Therefore, constructing a unified and open capability provision platform and reasonably expose capabilities of basic services, information and the like become keys for the operating companies to keep competitive in the future.

FIG. 1 is a schematic diagram of a capability exposure network architecture according to a related technology. As shown in FIG. 1, the network architecture may include the following parts.

A Mobile Network and Entity (MNE) includes: a control plane network element Mobility Management Entity (MME)/Serving General Packet Radio Service (GPRS), which is responsible for signaling control and mobility management; a user plane network element Packet Data Network Gateway (PGW)/Gateway GPRS Support Node (GGSN), which is responsible for bearer control and session management; a data plane network element Home Subscriber Server (HSS), which is responsible for subscription management of a user; a policy control network element Policy and Charging Rules Function (PCRF), which is responsible for making and transmission of a user Quality of Service (QoS) and charging policy; and other network elements.

A Capability Exposure Platform (CEP) is arranged to request a network for a network resource and information according to a requirement of a third party and provide differentiated service and a better user experience for the user, and is connected with each network element in the MNE respectively.

An APP server is arranged for the third party to provide rich and varied Internet service for the user. For example, APP1~APPn in FIG. 1 are connected with the CEP through Application Programming Interfaces (APIs).

A Network Data Application System (NDAS) is arranged for network data service, including service of query, storage, updating, deletion and the like of network data. The network data may be static network data, for example, underlying network information (information of a network component, a network resource, a component capability, a network topology and the like), network information of an existing network (information of a network element capability, network element load condition, user number, network topology and the like of the existing network) and user subscription information, and may also include dynamic network data, for example, user context information.

A Network Orchestrator Function (NOF) entity is responsible for dynamic orchestration of the network and the network elements, and is connected between the NDAS and the MNE.

With adoption of the capability exposure network architecture, a mobile network externally exposes mobile network information and a mobile network capability in a unified manner through a service opening platform. Exposure objects includes a third-party APP, own APP of an operating company and the like.

FIG. 2 is an existing capability exposure flow. As shown in FIG. 2, the flow includes the following steps.

In step 101, an APP server is required to call an API from a service exposure platform according to own service flow. For example, a regional location user density API in a user track APP scenario is called.

In step 102, a CEP preforms APP layer protocol conversion, and parses information of a capability to be acquired from a mobile network from the API (that is, requirement adaptation is performed). For example, it is parsed that a third-party APP is required to acquire user density information of a certain geographic region.

In step 103, the CEP acquires network capability information from an MNE. The network capability information includes a required network resource and user information. For example, the user density information of the geographic region is requested to be acquired. For this request, the MNE applies for network resource updating, collects the network resource and the user information, and returns the network capability information (for example, a telecommunication capability, terminal information and a network state) to the CEP. For example, current user density information of a certain geographic location is returned to the CEP.

In step 104, the CEP encapsulates the network capability information acquired by the MNE according to a requirement of the API, to form an adaptation result of API calling.

For example, user density information of a specific regional location is encapsulated into API information which may be called by the APP server.

In 105, the CEP returns the adaptation result of the API to the APP server, and the APP server implements various APPs and provide differentiated service for users according to different API information acquired from a network side.

The capability exposure network architecture exposes the network capability to the third-party APP. The third-party APP may request for QoS parameter updating, charging policy regulation (for example, a third party is a paid-by-user services), user preference information acquisition and the like through the CEP.

However, the network architecture mainly has the following shortcomings. For capability exposure oriented to a future 5G requirement, a current capability exposure architecture may expose a network capability and network information of an existing network to a third party. When a requirement of the third party exceeds the capability of the existing network, the existing network cannot provide an enhanced network capability or network resource. For example, a current virtual operating company is required to regularly lease a dedicated small network, or a newly added SP requires an additional network component to provide differentiated service, the current capability exposure network architecture cannot meet a capability exposure requirement exceeding the capability of the existing network. Therefore, an additional requirement of a third-party APP, the virtual operating company and the SP on the capability of the existing network cannot be met.

SUMMARY

The technical problem to be solved by the disclosure is to provide a capability exposure method and system and a capability exposure function entity, so as to at least solve the problem that capability exposure in the related technology is only limited to exposure of a network capability of an existing network and additional service exceeding the network capability of the existing network cannot be provided.

In order to solve the problem, the following technical solutions are adopted.

A capability exposure method is provided, which may include the following steps. A capability exposure function entity receives a requirement of a third party on a mobile network. The capability exposure function entity acquires current network information. The capability exposure function entity creates dedicated networking information on the basis of the requirement and the current network information. The dedicated networking information may be adopted to instruct creation at least one of a dedicated network or a dedicated network element. The capability exposure function entity sends the dedicated networking information to an NOF entity.

Optionally, the current network information may include underlying network information, or may include the underlying network information and existing network information. The existing network information may include multiple network elements networked in an existing network and capabilities, resource utilization rates and congestion states of the multiple network elements. The underlying network information may include a network topology of an underlying network, various network elements capable of being created in the underlying network, capabilities of the network elements, configuration information of the network elements and resource information of the underlying network.

Optionally, the action of creating, by the capability exposure function entity, the dedicated networking information on the basis of the requirement and the current network information may include the following steps. The capability exposure function entity matches the requirement with the underlying network information; extracts network elements meeting a requirement, all of the network elements being newly added network elements; determines a network topology and network resources required by the newly added network elements; and generates the dedicated networking information. Alternatively, the capability exposure function entity matches the requirement with the underlying network information; extracts network elements meeting the requirement, a part of the network elements being network elements of the existing network and remaining part of the network elements being newly added network elements; determines the network topology and network resources required by the newly added network elements; and generates the dedicated networking information.

Optionally, before the action of creating, by the capability exposure function entity, the dedicated networking information on the basis of the requirement and the current network information, the method may further include the following steps. The capability exposure function entity judges whether a network capability and performance of the existing network meet a service requirement of the third party or not according to the existing network information. If it is judged that the network capability and performance of the existing network do not meet the service requirement of the third part, the action of creating the dedicated networking information on the basis of the requirement and the current network information is executed.

Optionally, the action of acquiring, by the capability exposure function entity, the current network information may include the following steps. The capability exposure function entity acquires the underlying network information from an NDAS. Alternatively, the capability exposure function entity acquires the underlying network information from the NDAS, and acquires the existing network information from a network side or the NOF entity. Alternatively, the capability exposure function entity converts the requirement of the third party into a networking requirement to be sent to the NDAS. The NDAS acquires the existing network information from the network side or the NOF entity.

Optionally, the dedicated networking information may include any one or any combination of: a dedicated network type, the network topology, dedicated network element information, a connecting relationship between network elements, a network resource requirement and a user type.

Optionally, before the action of receiving, by the capability exposure function entity, the requirement of the third party on the mobile network, the method may further include the following steps. The capability exposure function entity receives a network capability acquisition request of the third party. The capability exposure function entity determines a network capability of a current network according to the current network information, and generates current network capability information according to the network capability of the current network. The capability exposure function entity sends a network capability message to the third party. The network capability message carries the current network capability information.

Optionally, before the action of creating, by the capability exposure function entity, the dedicated networking information on the basis of the requirement and the current network information, the method may further include the following steps. If the capability exposure function entity determines that the network capability of the current network does not meet the requirement of the third party on the mobile network according to the current network information, a requirement rejection message is sent to the third party, and the network capability of the current network is notified to the third party. The capability exposure function entity receives a requirement, updated according to the network capability of the current network, of the third party. For the updated requirement, the action of creating the dedicated networking information on the basis of the requirement and the current network information is executed.

Optionally, the action of sending, by the capability exposure function entity, the dedicated networking information to the NOF entity may include the following steps. The capability exposure function entity sends the dedicated networking information directly to the NOF entity. The capability exposure function entity sends the dedicated networking information to the NOF entity through the NDAS.

Optionally, after the action of sending, by the capability exposure function entity, the dedicated networking information to the NOF entity, the method may further include the following steps. The capability exposure function entity receives a creation completion message from the NOF entity. The creation completion message may carry newly created network information. The newly created network information may include a network identifier, a network topology, a network element identifier and network resource of at least one of the created dedicated network or the dedicated network element. The capability exposure function entity notifies the third party that the requirement is confirmed to be met, and notifies the newly created network information to the third party.

A capability exposure system is provided, which may include an information acquisition module, a requirement matching module and an interaction module. The information acquisition module may be arranged to receive a requirement of a third party on a mobile network and then acquire current network information. The requirement matching module may be arranged to create dedicated networking information on the basis of the requirement and the current network information. The dedicated networking information may be adopted to instruct creation of at least one of a dedicated network or a dedicated network element. The interaction module may be arranged to send the dedicated networking information to an NOF entity.

Optionally, the current network information may include underlying network information, or may include the underlying network information and existing network information. The existing network information may include multiple network elements networked in an existing network and capabilities, resource utilization rates and congestion states of the multiple network elements. The underlying network information may include a network topology of an underlying network, various network elements capable of being created in the underlying network, capabilities of the network elements, configuration information of the network elements and resource information of the underlying network.

Optionally, the requirement matching module may be arranged to create the dedicated networking information on the basis of the requirement and the current network information in the following manner. The requirement matching module matches the requirement with the underlying network information; extracts network elements meeting a requirement, all of the network elements being newly added network elements; determines a network topology and network resources required by the newly added network elements; and generates the dedicated networking information. Alternatively, the requirement matching module matches the requirement with the underlying network information; extracts network elements meeting the requirement, a part of the network elements being network elements of the existing network and reaming part of the network elements being newly added network elements; determines the network topology and network resources required by the newly added network elements; and generates the dedicated networking information.

Optionally, the requirement matching module may further be arranged to perform the following operations. Before creating the dedicated networking information on the basis of the requirement and the current network information, whether a network capability and performance of the existing network meet a service requirement of the third party or not is judged according to the existing network information. If the service requirement of the third party is not met, the operation of creating the dedicated networking information on the basis of the requirement and the current network information, is executed.

Optionally, the information acquisition module may be arranged to acquire the current network information in the following manner. The information acquisition module acquires the underlying network information from an NDAS. Alternatively, the information acquisition module acquires the underlying network information from the NDAS, and acquires the existing network information from a network side or the NOF entity. Alternatively, the information acquisition module converts the requirement of the third party into a networking requirement to be sent to the NDAS, and the NDAS acquires the existing network information from the network side or the NOF entity.

Optionally, the dedicated networking information may include any one of or any combination of: a dedicated network type, a network topology, dedicated network element information, a connecting relationship between network elements, a network resource requirement and a user type.

Optionally, the information acquisition module may further be arranged to perform the following operations. Before receiving the requirement of the third party on the mobile network, a network capability acquisition request of the third party is received. A network capability of a current network is determined according to the current network information. Current network capability information is generated according to the network capability of the current network. A network capability message is sent to the third party. The network capability message carries the current network capability information.

Optionally, the requirement matching module may further be arranged to perform the following operations. Before creating the dedicated networking information on the basis of the requirement and the current network information, if it is determined that the network capability of the current network does not meet the requirement of the third party on the mobile network according to the current network information, a requirement rejection message is sent to the third party, and the network capability of the current network is notified to the third party. A requirement, updated according to the network capability of the current network, of the third party is received. The operation of creating the dedicated networking information on the basis of the requirement and the current network information for the updated requirement, is executed.

Optionally, the interaction module may be arranged to send the dedicated networking information to the NOF entity in the following manner. The interaction module sends the dedicated networking information directly to the NOF entity. Alternatively, the interaction module sends the dedicated networking information to the NOF entity through the NDAS.

Optionally, the interaction module may further be arranged to perform the following operations. After sending the dedicated networking information to the NOF entity, a creation completion message is received from the NOF entity. The creation completion message may carry newly created network information, and the newly created network information may include a network identifier, a network topology, a network element identifier and network resource of at least one of the created dedicated network or the dedicated network element. It is notified to the third party that the requirement is confirmed to be met, and the newly created network information is notified to the third party.

A capability exposure function entity is provided, which may include: any abovementioned capability exposure system; a first interface, arranged to interact with an NDAS; and a second interface, arranged to interact with an NOF entity.

According to embodiments of the disclosure, a network element and a network are created for a third-party APP or an SP on the basis of a communication network architecture and a CEP. A network resource may be timely allocated. Additional service exceeding the network capability of the existing network may be provided. Therefore, when users of a small network, a dedicated network element, network leasing and the like face an emergency event or conduct a real-time business, a service requirement or network requirement of a newly added APP, a virtual operation company and the SP can be met. According to the embodiments of the disclosure, a capability exposure function imports the requirement of the third party on the mobile network. The capability exposure function interacts with the NOF entity, and sends the generated dedicated networking information to the NOF entity. The NOF entity creates the dedicated network or network element to meet the service requirement or network requirement of the third party. Therefore, virtual operation and differentiated user service requirements of the third party are met, and a user experience is effectively improved.

The other characteristics and advantages of the disclosure will be elaborated in the following specification, and moreover, partially become obvious from the specification or are understood by implementing the disclosure. The purpose and other advantages of the disclosure may be achieved and obtained through structures specially pointed out in the specification, the claims and the drawings.

BRIEF DESCRIPTION OF DRAWINGS

The drawings described here are adopted to provide a further understanding to the disclosure, and form a part of the disclosure. Schematic embodiments of the disclosure and descriptions thereof are adopted to explain the disclosure and not intended to form improper limits to the disclosure. In the drawings.

DETAILED DESCRIPTION

The below is a summary about a theme described in the disclosure in detail. The summary is not intended to limit the scope of protection of the claims.

The technical solutions of the disclosure will be described below in combination with the drawings and embodiments in more detail.

It should be noted that, without conflicts, the embodiments of the disclosure and each characteristic in the embodiments may be combined and shall all fall within the scope of protection of the disclosure. In addition, although logic sequences are shown in the flowcharts, the shown or described steps may be executed in sequences different from those described here in some circumstances.

First Embodiment

Figure 3:
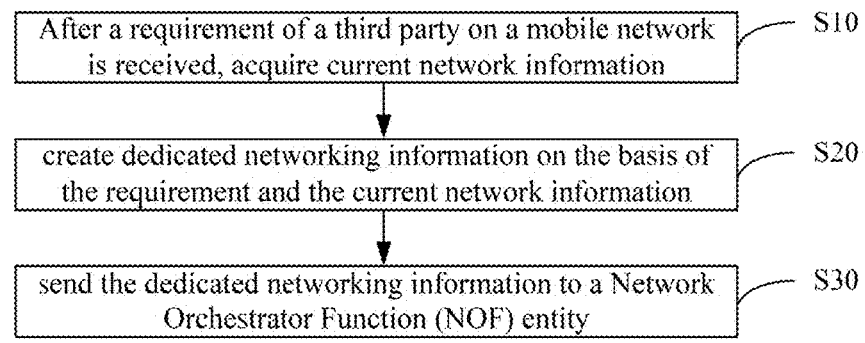
FIG. 3 is a flowchart of a capability exposure method according to a first embodiment of the disclosure.

A capability exposure method, as shown in FIG. 3, includes the following steps.

In step S10, after a requirement of a third party on a mobile network is received, current network information is acquired.

In S20, dedicated networking information is created on the basis of the requirement and the current network information, the dedicated networking information being adopted to instruct creation of at least one of a dedicated network or a dedicated network element.

In S30, the dedicated networking information is sent to an NOF entity.

Optionally, the current network information includes underlying network information, or includes existing network information and the underlying network information.

Optionally, the existing network information includes, but not limited to, each network element networked in an existing network, capabilities of the network elements, resource utilization rates of the network elements, congestion states of the network elements and the like.

Optionally, the underlying network information includes, but not limited to, a network topology of an underlying network, various network elements capable of being created in the underlying network, capabilities of the network elements, configuration information of the network elements, resource information of the underlying network and the like.

Optionally, the dedicated networking information includes, but not limited to, any one of or any combination of:

a dedicated network type, a network topology, dedicated network element information, a connecting relationship between network elements, a network resource requirement, a user type and the like.

Optionally, the action of creating the dedicated networking information on the basis of the requirement and the current network information includes the following steps.

The requirement is matched with the underlying network information. Network elements meeting a requirement are extracted, all of the network elements being newly added network elements. The network topology and network resources required by the newly added network elements are determined. The dedicated networking information is generated;

Alternatively, the requirement is matched with the underlying network information. Network elements meeting the requirement are extracted, a part of the network elements being network elements of the existing network and remaining part of the network elements being newly added network elements. The network topology and network resources required by the newly added network elements are determined. The dedicated networking information is generated.

Optionally, before the action of creating the dedicated networking information on the basis of the requirement and the current network information, the method further includes the following steps.

Whether a network capability and performance of the existing network meet a service requirement of the third party or not is judged according to the existing network information. When the network capability and performance of the existing network do not meet the service requirement of the third party, the action of creating the dedicated networking information on the basis of the requirement and the current network information is executed.

When whether the network capability and performance of the existing network can meet the service requirement of the third party or not is judged according to the existing network information, whether the requirement is a requirement of a dedicated small network or a requirement of a newly added service on the dedicated network element or not may be judged at first according to originally stored existing network information. If it is judged that the requirement is a requirement of a dedicated small network or a requirement of a newly added service on the dedicated network element, it is determined that the network capability and performance of the existing network does not meet the service requirement of the third party. If it is judged that the requirement is not a requirement of a dedicated small network or a requirement of a newly added service on the dedicated network element, latest existing network information is acquired from the NOF entity or a network side for continuous judgment.

Optionally, the action of acquiring the current network information after the requirement of the third party on the mobile network is received includes the following steps.

A capability exposure function entity acquires the underlying network information from an NDAS.

Alternatively, the capability exposure function entity acquires the underlying network information from the NDAS, and acquires the existing network information from a network side or the NOF entity.

Alternatively, the capability exposure function entity converts the requirement of the third party into a networking requirement to be sent to the NDAS, and the NDAS acquires the existing network information from the network side or the NOF entity.

Optionally, the action of sending the dedicated networking information to the NOF entity includes the following steps. The capability exposure function entity sends directly or sends, through the NDAS, the dedicated networking information to the NOF entity.

Optionally, before the action of receiving the requirement of the third party on the mobile network, the method further includes the following steps.

A network capability acquisition request of the third party is received.

A network capability which may practically be supported by a current network is determined according to the existing network information and the underlying network information. Current network capability information is generated according to the network capability.

A network capability message carrying the current network capability information is sent to the third party.

Optionally, before the action of creating the dedicated networking information on the basis of the requirement and the current network information, the method further includes the following steps.

If it is determined that the network capability which may practically be supported by the current network does not meet the requirement of the third party on the mobile network according to the current network information, a requirement rejection message is sent to the third party, and the network capability which may practically be supported by the current network is notified to the third party.

A requirement, updated according to the network capability which may practically be supported by the current network, of the third party is received. The action of creating the dedicated networking information on the basis of the requirement and the current network information is executed, for the updated requirement.

Optionally, after the action of sending the dedicated networking information to the NOF entity, the method further includes the following steps.

A creation completion message is received from the NOF entity. The creation completion message carries newly created network information, which includes a network identifier, a network topology, a network element identifier and a network resource of at least one of the created dedicated network or the dedicated network element.

The third party is notified that the requirement is confirmed to be met, and the newly created network information is notified to the third party.

Second Embodiment

Figure 4:
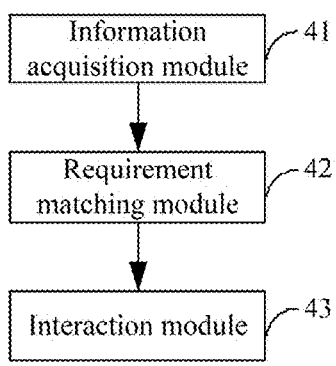
FIG. 4 is a schematic diagram of a capability exposure system according to a second embodiment of the disclosure.

A capability exposure system, as shown in FIG. 4, includes an information acquisition module 41, a requirement matching module 42 and an interaction module 43. The information acquisition module 41 is arranged to acquire current network information after receiving a requirement of a third party on a mobile network.

The requirement matching module 42 is arranged to create dedicated networking information on the basis of the requirement and the current network information. The dedicated networking information is adopted to instruct creation of at least one of a dedicated network or a dedicated network element.

The interaction module 43 is arranged to send the dedicated networking information to an NOF entity.

The capability exposure system in the embodiment may be arranged in a capability exposure function entity, and may also be arranged in an NDAS. In case of arrangement in the NDAS, the requirement, received by the information acquisition module 41, of the third party is a networking requirement converted by the capability exposure function entity.

Optionally, the current network information includes underlying network information, or includes the underlying network information and existing network information. The existing network information includes each network element networked in an existing network, capabilities of the network elements, resource utilization rates of the network elements and congestion states of the network elements. The underlying network information includes a network topology of an underlying network, various network elements capable of being created in the underlying network, capabilities of the network elements, configuration information of the network elements and resource information of the underlying network.

Optionally, the operation of creating, by the requirement matching module 42, the dedicated networking information on the basis of the requirement and the current network information including the following operations.

The requirement matching module 42 matches the requirement with the underlying network information; extracts network elements meeting a requirement, all of the network elements being newly added network elements; determines a network topology and network resources required by the newly added network elements; and generates the dedicated networking information;

Alternatively, the requirement matching module 42 matches the requirement and the underlying network information; extracts network elements meeting the requirement, a part of the network elements adopting network elements of the existing network and remaining part of the network elements being newly added network elements; determines the network topology and network resources required by the newly added network elements; and generates the dedicated networking information.

Optionally, the dedicated networking information includes any one of or any combination of:

a dedicated network type, a network topology, dedicated network element information, a connecting relationship between network elements, a network resource requirement and a user type.

Optionally, the requirement matching module 42 is further arranged to: before creating the dedicated networking information on the basis of the requirement and the current network information, judge whether a network capability and performance of the existing network meet a service requirement of the third party or not according to the existing network information, and if the service requirement of the third party is not met, execute the operation of creating the dedicated networking information on the basis of the requirement and the current network information.

Optionally, the information acquisition module 41 is further arranged to: before receiving the requirement of the third party on the mobile network, receive a network capability acquisition request of the third party; determine a network capability which may practically be supported by a current network according to the current network information, and generate current network capability information according to the network capability which may practically be supported by the current network; and send a network capability message carrying the current network capability information to the third party.

Optionally, the requirement matching module 42 is further arranged to: before creating the dedicated networking information on the basis of the requirement and the current network information, if it is determined that the network capability which may practically be supported by the current network does not meet the requirement of the third party on the mobile network according to the current network information, send a requirement rejection message to the third party, and notify the network capability which may practically be supported by the current network to the third party; receive a requirement, updated according to the network capability which may practically be supported by the current network, of the third party; and execute the operation of creating the dedicated networking information on the basis of the requirement and the current network information for the updated requirement.

Optionally, the operation of acquiring, by the information acquisition module 41, the current network information after receiving the requirement of the third party on the mobile network include the following operations.

The information acquisition module 41 acquires the underlying network information from an NDAS.

Alternatively, the information acquisition module 41 acquires the underlying network information from the NDAS, and acquires the existing network information from a network side or the NOF entity.

Alternatively, the information acquisition module 41 converts the requirement of the third party into a networking requirement to be sent to the NDAS, and the NDAS acquires the existing network information from the network side or the NOF entity.

Optionally, sending, by the interaction module 43, the dedicated networking information to the NOF entity including the following operations.

The interaction module 43 sends the dedicated networking information directly to the NOF entity, or sends the dedicated networking information to the NOF entity through the NDAS.

Optionally, the interaction module 43 is further arranged to: after sending the dedicated networking information to the NOF entity, receive a creation completion message from the NOF entity, the creation completion message containing newly created network information, including a network identifier, network topology, network element identifier and network resource of at least one of the created dedicated network or the dedicated network element; and notify the third party that the requirement is confirmed to be met, and notify the newly created network information to the third party.

Embodiment 3

Figure 5:
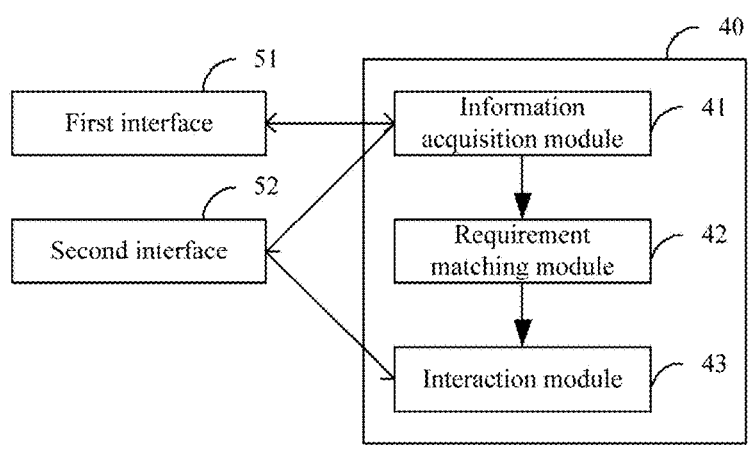
FIG. 5 is a schematic diagram of a capability exposure function entity according to a third embodiment of the disclosure.

A capability exposure function entity, as shown in FIG. 5, includes:

a capability exposure system 40 in embodiment 2;

a first interface 51, arranged to interact with an NDAS; and a second interface 52, arranged to interact with an NOF entity.

Optionally, the capability exposure function entity interacts with the NDAS through the first interface 51 to acquire underlying network information of the NDAS and send a requirement of a third party or dedicated networking information to the NDAS.

Optionally, the capability exposure function entity interacts with the NOF entity through the second interface 52 to acquire existing network information from the NOF entity, send the dedicated networking information to the NOF entity and receive a creation completion message returned after the NOF entity creates a at least one of a dedicated network or a dedicated network element.

The embodiment differs from the existing network capability exposure technology in the follows. The capability exposure of the embodiment of the disclosure may additionally create at least one of a dedicated network or a dedicated network element according to a requirement of a third party and perform capability exposure on the third party, so as to meet a requirement of the third party on support of a new service and the dedicated network.

In the embodiment of the disclosure, a requirement from the third party is received. The requirement of the third party may be an APP requirement of the third party, or a newly added service requirement of an SP, or a leasing requirement of a virtual operating company on the dedicated network, or the like. After receiving the requirement of the third party on a mobile network, a capability exposure function entity may acquire current network information, including existing network information and underlying network information from a network side. The existing network information may be acquired from the network side, and includes each network element of an existing network, capabilities of the network elements, load states of the network elements of the existing network and the like. The underlying network information includes information such as a network topology of a current network, various network elements supported by the network, capabilities of the network elements, a maximum performance supported by the network and a network resource. The capability exposure function entity or an NDAS matches the requirement of the third party with a network capability and performance of the existing network. If the network capability and performance of the existing network does not meet the requirement, it is required to search for performance and resources which may be provided by network elements and network meeting the requirement according to the underlying network information and generate dedicated networking information adopted to instruct creation of at least one of a dedicated network or dedicated network element meeting the requirement. The requirement of the third party on the mobile network is met in a manner of creating at least one of the dedicated network or the dedicated network element.

The capability exposure function entity may be independent equipment or reuses a server platform in which an interface between a capability exposure function and each of the NDAS and an NOF entity is newly added. When the method in the first embodiment is implemented through the capability exposure function entity, the capability exposure function entity may send the created dedicated networking information to the NOF entity through the interface to instruct the NOF entity to create at least one of the dedicated network or the dedicated network element for the third party and allocate a required network resource.

The NOF entity may send a creation completion message to the capability exposure function entity or the NDAS after completing creating at least one of the dedicated network or the dedicated network element. The creation completion message carries newly created network information, which includes, but not limited to: information such as a network identifier, a network topology, a network element identifier and network resource of at least one of the created dedicated network or dedicated network element. After receiving the creation completion message, the capability exposure function entity or the NDAS notifies the third party that the requirement is met, and simultaneously notifies the newly created network information to the third party. The third party adopts at least one of the dedicated network or the dedicated network element to implement corresponding network service and business service for a specific user to meet a differentiated requirement of the user.

In the dedicated networking information, a network element set required by the dedicated network may be a combination of a part of network elements of the existing network and newly added network elements, or is totally formed by newly added network elements. If the part of network elements of the existing network have sufficient network resources and may meet the requirement of the third party, the part of network elements of the existing network and the newly added network elements may be networked into a dedicated small network. For example, in the dedicated small network, a base station in the existing network may be included. A part of radio resources thereof may be externally leased. An RCRF network element may be included, and other network elements may be created (that is: newly added network elements are adopted). Another manner is that both the base station and the PCRF network element are created and not coupled with network elements of the existing network.

The embodiment of the disclosure will be described below with reference to the drawings and in combination with implementation examples in detail.

First Implementation Example

Figure 6:
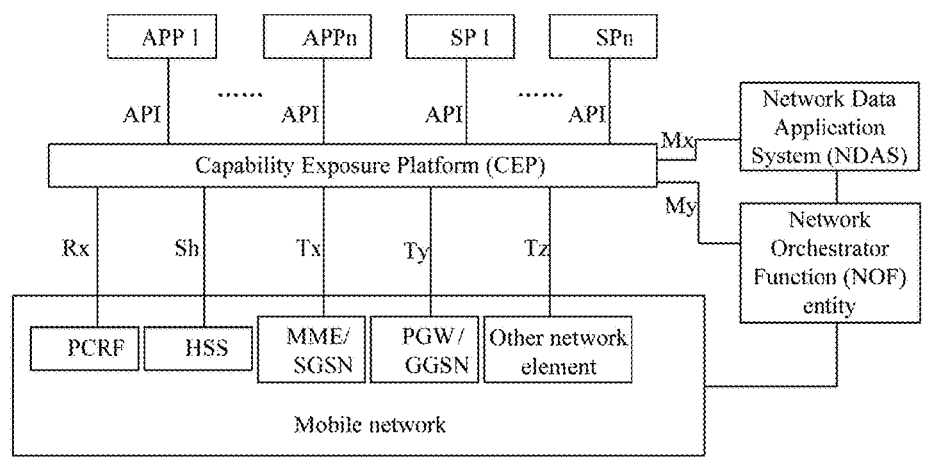
FIG. 6 is a structure block diagram of an enhanced capability exposure architecture according to a first implementation example of the disclosure.

The example is a structure diagram of an enhanced communication network architecture constructed on the basis of the embodiment of the disclosure. As shown in FIG. 6, in the enhanced communication network architecture, a capability exposure function entity may include: an My interface between the capability exposure function entity and an NOF entity and an Mx interface between the capability exposure function entity and an NDAS. The capability exposure function entity may interact with the NDAS through the Mx interface. For example, they may interact about underlying network information. The capability exposure function entity may also transmit dedicated networking information created by the capability exposure function entity to the NDAS through the Mx interface, and the NDAS forwards it to the NOF entity. The capability exposure function entity may send the created dedicated networking information to the NOF entity through the My interface. After completing creating at least one of a dedicated network or a dedicated network element, the NOF entity sends a creation completion message to the capability exposure function entity through the My interface.

The Mx interface is an interface between the capability exposure function entity and the NDAS. The interface is arranged for information interaction and forwarding between the two network elements, for example, acquisition of the underlying network information, or sending of the dedicated networking information to the NDAS and forwarding to the NOF entity by the NDAS.

The My interface is an interface between the capability exposure function entity and the NOF entity. The interface is arranged for information interaction between the two network elements, for example, interaction about the dedicated networking information and interaction about the creation completion message.

The capability exposure function entity has functions of requirement importing, protocol conversion, dedicated networking information creation and the like. The capability exposure function entity recognizes an imported requirement and matches the imported requirement with a capability of a current network to judge whether at least one of the dedicated network or the dedicated network element is required to be created to meet the requirement. The capability exposure function entity acquires related network information from a network side and the NDAS, and creates the dedicated networking information meeting the requirement.

The NOF entity may perform the following operations. A network construction requirement is received, for example, a construction requirement on the dedicated network or the dedicated network element in the dedicated networking information, from the capability exposure function entity. At least one of the dedicated network or the dedicated network element is created. A required network resource is allocated. The completion creation message is returned to the capability exposure function entity after successfully creating at least one of the dedicated network or the dedicated network element.

Figure 1:
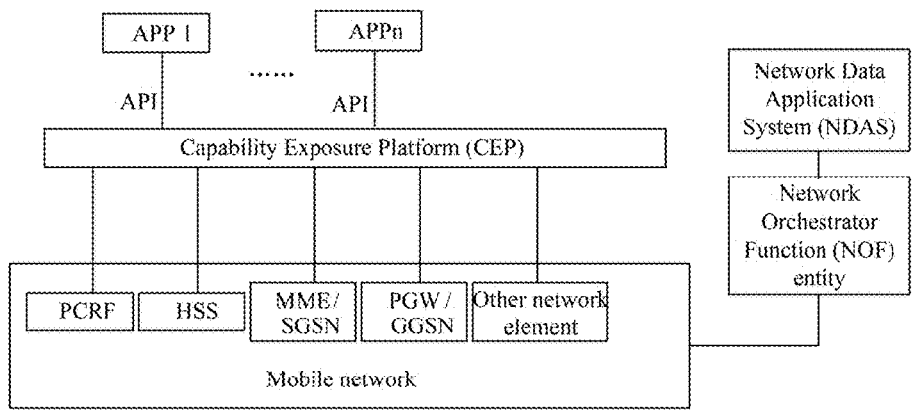
FIG. 1 is a structure block diagram of a capability exposure network architecture according to the related technology.
Figure 2:
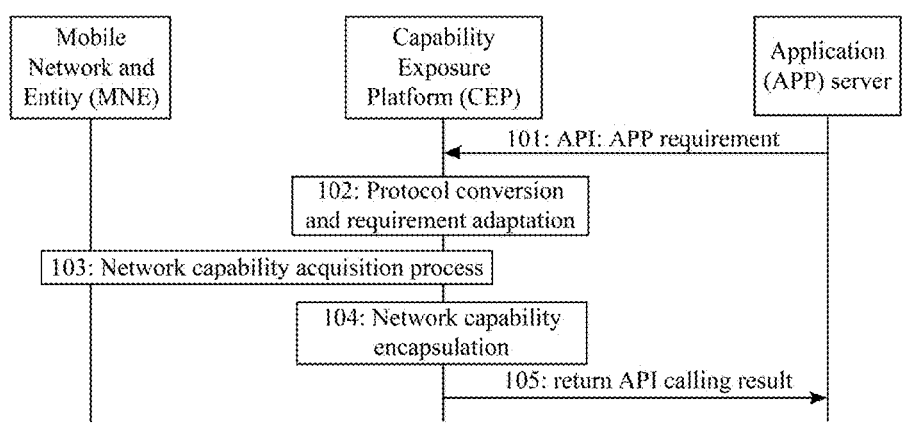
FIG. 2 is a flowchart of capability exposure implementation according to the related technology.

In addition, in the architecture, an SP (SP1~SPn in FIG. 1) may also be connected with the capability exposure function entity through an API, and the other parts are the same as FIG. 1.

Second Implementation Example

Figure 7:
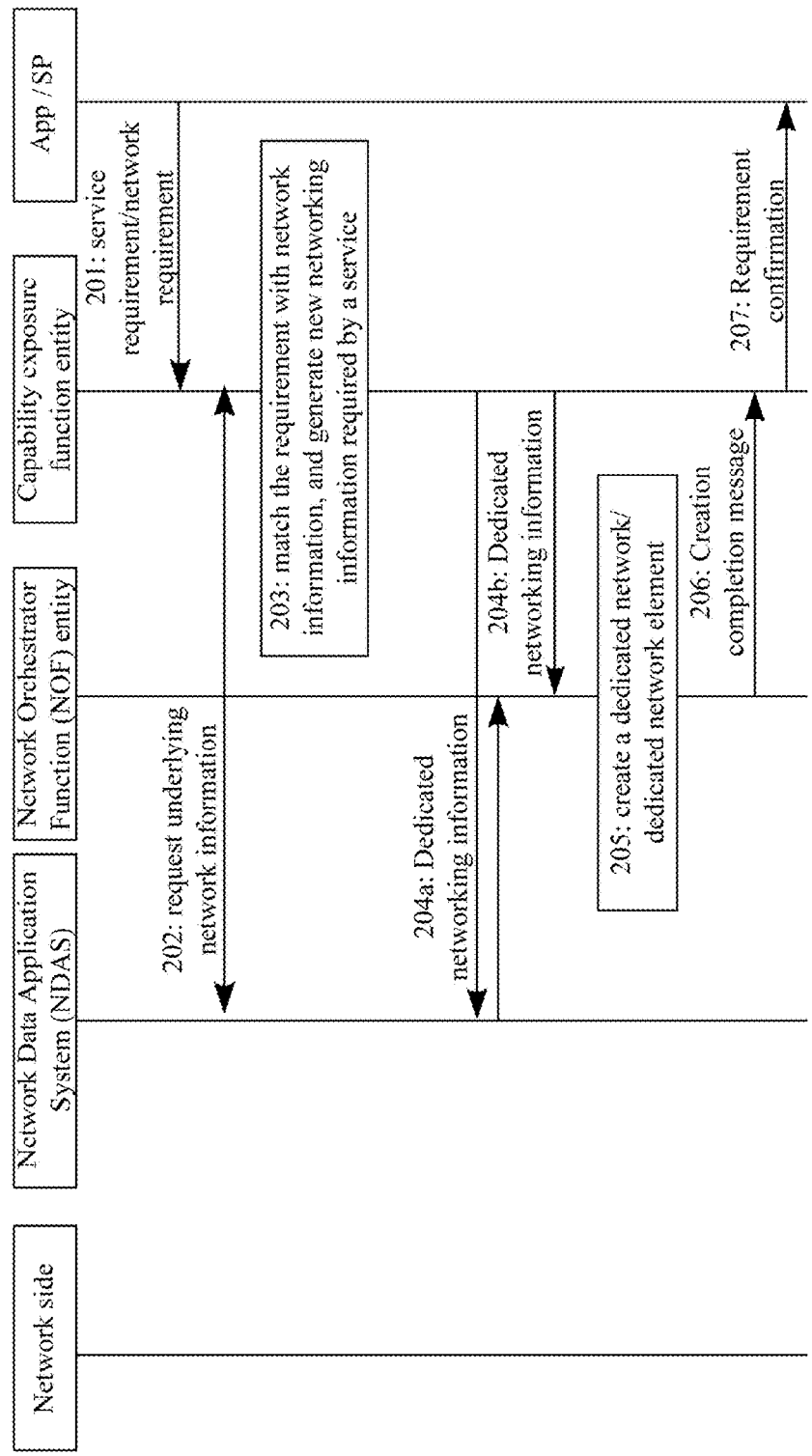
FIG. 7 is a flowchart of a capability exposure method according to a second implementation example of the disclosure.

According to a capability exposure method, a third-party APP/SP/virtual operating company imports a requirement on a mobile network. At least one of a dedicated network or a dedicated network element is created through a capability exposure function entity, so as to meet a requirement on a network capability which cannot be provided by an existing network. As shown in FIG. 7, the method may include the following processing steps.

In Step 201, the third-party APP/SP/virtual operating company requests the capability exposure function entity for a network requirement, and imports its requirement on the mobile network, including a service requirement or a network requirement. For example, the virtual operating company has a leasing requirement on a small network. An Internet of things SP requires provision of an Internet of things serivces such as telemedicine, smart home and remote meter reading.

In Step 202, after the capability exposure function entity determines that the imported requirement is a requirement on a dedicated small network or a requirement of a newly added service on a dedicated network element (for example, an Internet of things service control network element), the capability exposure function entity requests an NDAS for underlying network information, including a network topology, underlying network element information, an ultimate network capability which may be provided by a network, ultimate network resource information and the like.

In Step 203, the capability exposure function entity extracts network elements meeting a requirement from the underlying network information to form the network topology, configures a network resource requirement, and generates dedicated networking information. For example, for the small network, the dedicated networking information is required to include each required network element, a connecting relationship between each network element, a network resource requirement of each network element and the like. For the dedicated network element, the dedicated networking information is required to include the dedicated network element meeting the requirement, a connecting relationship between the dedicated network element and a network element in an existing network, a network resource requirement of the dedicated network element and the like.

A Step 204 may be implemented in two alternative steps of a Step 204a or a Step 204b.

In the Step 204a, the capability exposure function entity may send the dedicated networking information to the NDAS, and the NDAS forwards the dedicated network information to an NOF entity.

In the Step 204b, the capability exposure function entity directly sends the dedicated networking information to the NOF entity.

In Step 205, after receiving the dedicated networking information, the NOF entity creates at least one of the required dedicated network or dedicated network element for a third party, and allocates a required network resource.

In Step 206, after completing creating at least one of the dedicated network or the dedicated network element, the NOF entity may notify a creation completion message to the capability exposure function entity. The creation completion message includes newly created network information, which includes a network identifier, a network topology, a network element identifier, network resource and the like of at least one of the created dedicated network or dedicated network element.

In Step 207, the capability exposure function entity notifies the third party that the requirement is confirmed to be met, and simultaneously notifies description information of at least one of the created dedicated network or dedicated network element to the third party.

The third party adopts at least one of the dedicated network or the dedicated network element to implement corresponding network service and business service for a specific user to meet a differentiated requirement of the user.

As can be seen from the implementation example, the capability exposure function entity performs network element and network topology matching on the imported requirement according to the underlying network information of the network; extracts the related network elements and network resources required by the requirement; generates the dedicated networking information; and sends the dedicated networking information to the NOF entity to create at least one of the dedicated network or the dedicated network element to meet the practical requirement of the third party.

Third Implementation Example

Figure 8:
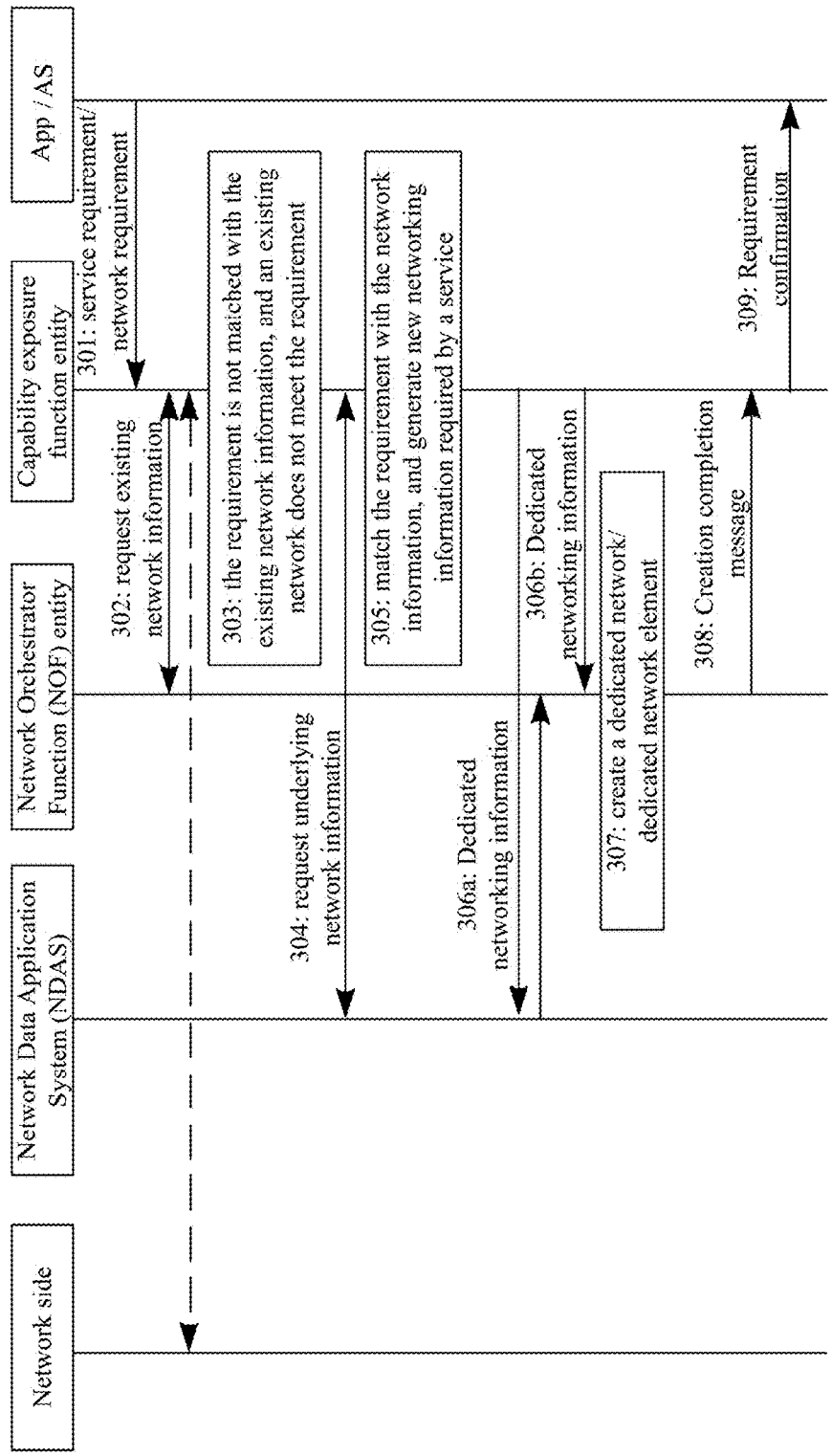
FIG. 8 is a flowchart of a capability exposure method according to a third implementation example of the disclosure.

According to a capability exposure method, a third-party APP/SP/virtual operating company imports a requirement on a mobile network. When a capability exposure function entity judges that a capability of an existing network fails to meet the imported requirement, and the capability exposure function entity matches the requirement with existing network information and underlying network information, generates dedicated networking information and sends it to an NOF entity to create a new network or network element to meet a requirement on a network capability which cannot be provided by an existing network. As shown in FIG. 8, the method may include the following processing steps.

In Step 301, the third-party APP/SP/virtual operating company requests the capability exposure function entity for a network requirement, and imports its requirement on the mobile network, including a service requirement or a network requirement. For example, the virtual operating company has a leasing requirement on a small network. An Internet of things SP requires provision of an Internet of things services such as telemedicine, smart home and remote meter reading.

In Step 302, after receiving the requirement of a third party, the capability exposure function entity is required to judge whether a network capability and performance of the existing network meet the service requirement of the third party or not according to the existing network information.

The capability exposure function entity requests an NOF entity for the existing network information, including information such as performance of the existing network, a network topology relationship, composition of each network element, capabilities of the network elements and load conditions of the network elements. In case of a failure in acquisition from the NOF entity, the capability exposure function entity may directly acquire the existing network information from a network side.

In Step 303, the capability exposure function entity matches the requirement of the third party on the mobile network with a practical capability of the existing network. If the network capability and performance of the existing network does not meet the requirement, it is required to create at least one of a new dedicated network or create a new dedicated network element to meet the requirement of the third party.

In Step 304, the capability exposure function entity requests an NDAS for underlying network information, including a current network topology, information of various network elements, an ultimate network capability which may be provided by the network, ultimate network resource information and the like.

In Step 305, the capability exposure function entity matches the requirement with the existing network information and the underlying network information, extracts network elements meeting a requirement to form the network topology, configures a network resource requirement and generates dedicated networking information. The network elements meeting the requirement may be network elements not existing in an existing network, and are required to be created. A part of them may also be network elements in the existing network, have relatively lighter loads, and meet the requirement on the network capability.

A Step 306 may be implemented in two alternative steps of a Step 306a or a Step 306b.

In the Step 306a, the capability exposure function entity may send the dedicated networking information to the NDAS, and the NDAS forwards the dedicated networking information to an NOF entity.

In the Step 306b, the capability exposure function entity sends the dedicated networking information directly to the NOF entity.

In Step 307, after receiving the dedicated networking information, the NOF entity creates at least one of the required dedicated network or dedicated network element for the third party, and allocates a required network resource.

In Step 308, after completing creating at least one of the dedicated network or the dedicated network element, the NOF entity may notify a creation completion message to the capability exposure function entity. The creation completion message includes newly created network information, which includes a network identifier, a network topology, a network element identifier, network resource and the like corresponding to at least one of the created dedicated network or dedicated network element.

In Step 309, the capability exposure function entity notifies the third party that the requirement is confirmed to be met, and simultaneously notifies description information of at least one of the created dedicated network or dedicated network element to the third party.

The third party adopts at least one of the dedicated network or the dedicated network element to implement corresponding network service and business service for a specific user to meet a differentiated requirement of the user.

As can be seen from the implementation example, the capability exposure function entity, after it is judged that the network capability and performance of the existing network cannot meet the requirement, imported by the third party, on the mobile network, may extract the related network elements and network resources required by the requirement according to the underlying network information of the network, generate the dedicated networking information and send the dedicated networking information to the NOF entity to create at least one of the dedicated network or the dedicated network element to meet the practical requirement of the third party.

Fourth Implementation Example

Figure 9:
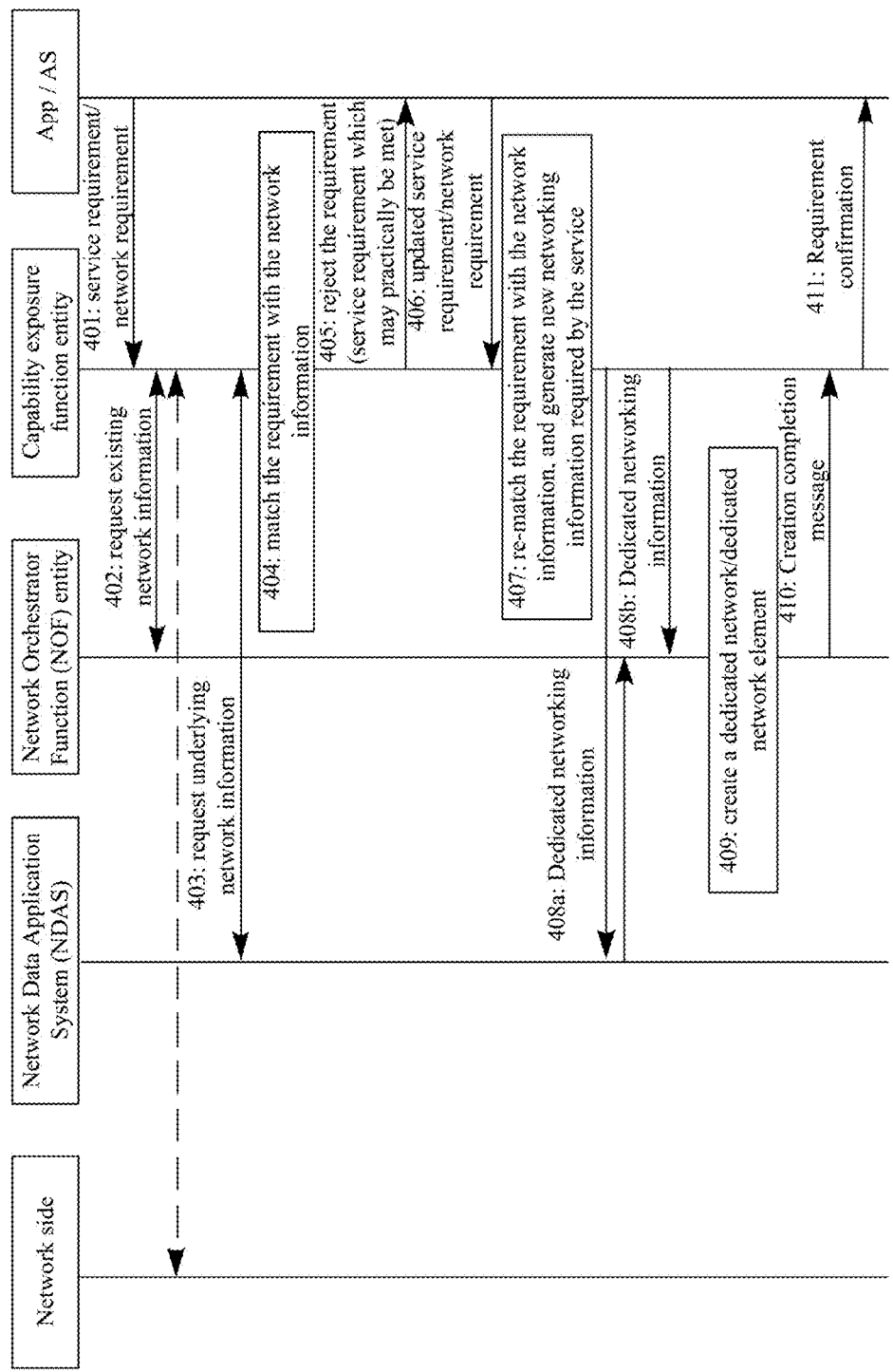
FIG. 9 is a flowchart of a capability exposure method according to a fourth implementation example of the disclosure.

According to a capability exposure method, a third-party APP/SP/virtual operating company imports a requirement on a mobile network, and requests for a network resource through a capability exposure function entity. When a network capability which may practically be supported by a current network does not meet the requirement of a third party, a feedback is given to the third party and the third party regulates the requirement to enable the network to provide related service. As shown in FIG. 9, the method may include the following processing steps.

In Step 401, the third-party APP/SP/virtual operating company requests the capability exposure function entity for a network requirement, and imports its requirement on the mobile network, including a service requirement or a network requirement. For example, the virtual operating company has a leasing requirement on a small network. An Internet of things SP requires provision of an Internet of things service such as telemedicine, smart home and remote meter reading.

In Step 402, after receiving a service request or network request of a third party, the capability exposure function entity is required to judge whether a network capability and performance of an existing network meet the service requirement of the third party or not according to existing network information.

The capability exposure function entity requests an NOF entity for the existing network information, which includes information such as performance of the existing network, a network topology relationship, composition of each network element, capabilities of the network elements and load conditions of the network elements. In case of a failure in acquisition from the NOF entity, the capability exposure function entity may directly acquire the existing network information from a network side.

The capability exposure function entity matches the requirement on the mobile network with the network capability and performance of the existing network. If the network capability and performance of the existing network does not meet the requirement, it is required to create at least one of a new dedicated network or create a new dedicated network element to meet the requirement of the third party.

In Step 403, the capability exposure function entity requests an NDAS for underlying network information, which includes a current network topology, information of various network elements, an ultimate network capability which may be provided by the network, ultimate network resource information and the like.

In Step 404, the capability exposure function entity matches the requirement with the existing network information and the underlying network information. When a network capability which may practically be supported by a current network, for example, a service characteristic, network performance, network resource and network element function supported by the network, does not meet the requirement, the capability exposure function entity converts the network capability which may practically be supported by the current network into service requirement/network requirement information which may be met by the network.

In Step 405, the capability exposure function entity sends a requirement rejection message to the third party, and feeds back the service requirement/network requirement information which may be met by the network to the third-party APP/SP.

In Step 406, after receiving the requirement rejection message of the capability exposure function entity, the third-party APP/SP regulates its service requirement/network requirement according to the requirement information which may be met in the requirement rejection message, and updates the imported service requirement/network requirement to enable the network to provide network service. The third-party APP/SP sends an updated requirement to the capability exposure function entity.

In Step 407, the capability exposure function entity matches the requirement with the existing network information and the underlying network information, extracts network elements meeting a requirement to form the network topology, configures a network resource requirement and generates dedicated networking information. The network elements meeting the requirement may be network elements not existing in an existing network, and are required to be created. A part of the network elements may also be network elements in the existing network, have relatively lighter loads, and meet the requirement on the network capability.

A Step 408 may be implemented in two alternative steps of a Step 408a or a Step 408b.

In Step 408a, the capability exposure function entity may send the dedicated networking information to the NDAS, and the NDAS forwards the dedicated networking information to an NOF entity.

In Step 408b, the capability exposure function entity sends the dedicated networking information directly to the NOF entity.

In Step 409, after receiving the dedicated networking information, the NOF entity creates at least one of the required dedicated network or dedicated network element for the third party, and allocates a required network resource.

In Step 410, after completing network creation, the NOF entity may notify a creation completion message to the capability exposure function entity. The creation completion message including newly created network information, which includes a network identifier, a network topology, a network element identifier, network resource and the like of at least one of the created dedicated network or dedicated network element.

In Step 411, the capability exposure function entity notifies the third party that the requirement is confirmed to be met, and simultaneously notifies description information of at least one of the created dedicated network or dedicated network element to the third party.

The third party adopts at least one of the dedicated network or the dedicated network element to implement corresponding network service and business service for a specific user to meet a differentiated requirement of the user.

As can be seen from the implementation example, after the capability exposure function entity judges that the network capability which may practically be supported by the current network does not meet the imported requirement on the mobile network, the capability exposure function entity converts the network capability which may practically be supported by the current network into the service requirement/network requirement which may be met by the existing network, and feeds back it to the third party. The third party dynamically updates the imported requirement to enable the network to meet the imported requirement. The capability exposure function entity interacts with the third party about the requirement in the implementation example, and then the imported requirement may be dynamically regulated, so that the problem that the network side cannot meet the requirement of the third party is solved.

Fifth Implementation Example

Figure 10:
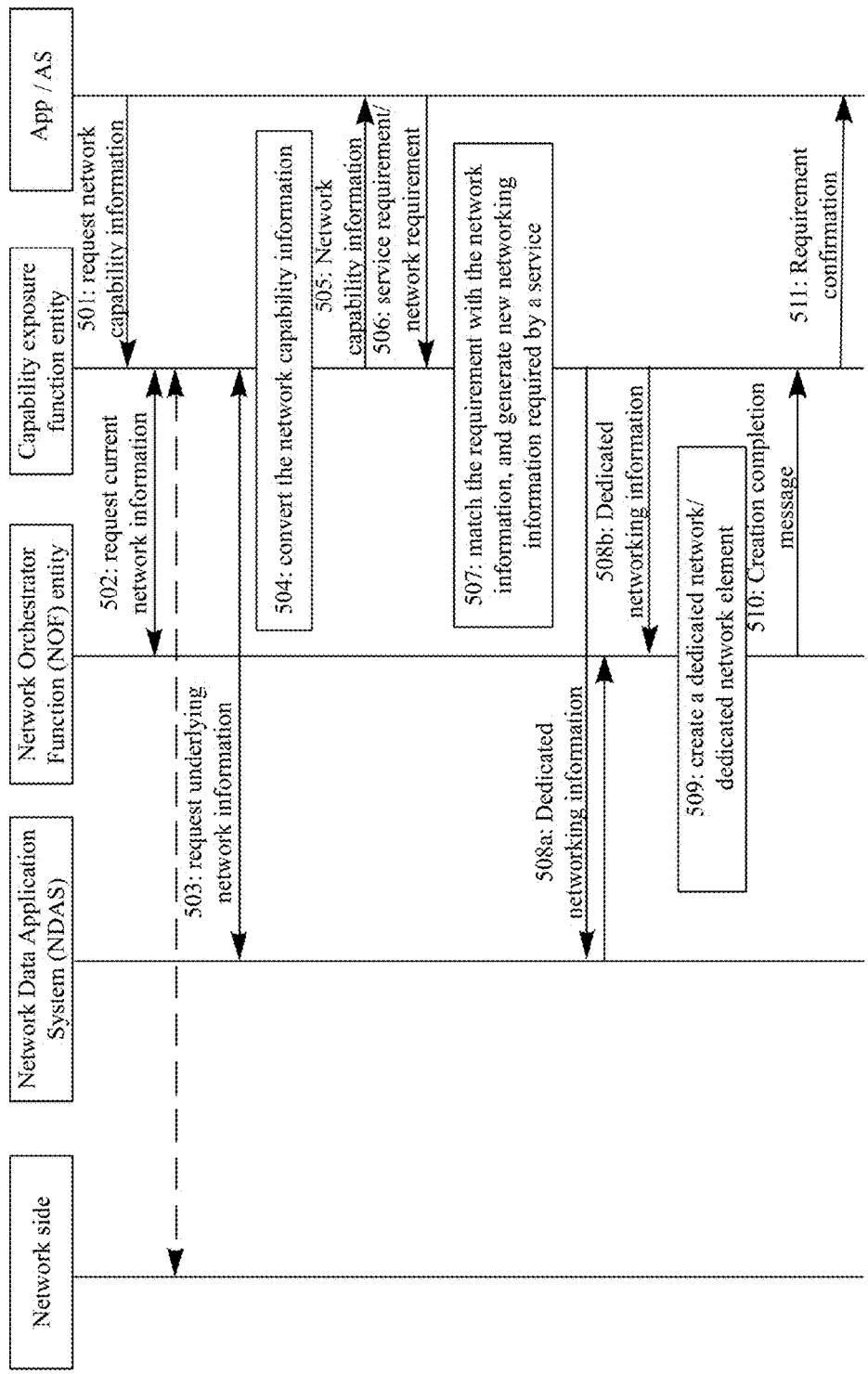
FIG. 10 is a flowchart of a capability exposure method according to a fifth implementation example of the disclosure.

According to a capability exposure method, a third-party APP/SP/virtual operating company acquires a network capability which may practically be supported by a current network at first through a capability exposure function entity, and imports a service requirement or network requirement which may be met by the current network according to the network capability which may practically be supported by the current network to enable the network to provide related service for a third party. As shown in FIG. 10, the method may include the following processing steps.

In Step 501, the third-party APP/SP/virtual operating company requests the capability exposure function entity for the network capability which practically be supported by the current network, including a service characteristic supported by the network, for example, a remote meter reading service and smart home service related to an Internet of things service; network performance, for example, a number of users which may be supported by the network; a network resource, for example, an allocable calculation resource, bandwidth resource and storage resource of the network; and a network element function, for example, an M2M service optimization function and terminal dormancy function supported by a control plane network element. If knowing a network capability of an existing network, the third party may flexibly and dynamically apply for the network resource to provide optimal differentiated service for a user.

In Step 502, after receiving a network capability acquisition request of the third party, the capability exposure function entity requests an NOF entity for existing network information, including information such as performance of the existing network, a network topology relationship, composition of each network element, capabilities of the network elements and load conditions of the network elements. In case of a failure in acquisition from the NOF entity, the capability exposure function entity may directly acquire it from a network side.

In Step 503, the capability exposure function entity requests an NDAS for underlying network information, which includes a current network topology, information of various network elements, an ultimate network capability which may be provided by the network, ultimate network resource information and the like.

In Step 504, the capability exposure function entity performs protocol conversion to translate the network capability, for example, the service characteristic, the network performance, the network resource and the network element function, which may practically be supported by the current network into a data format recognizable for the third party according to conditions of the existing network information and the underlying network information, and generates current network capability information.

In Step 505, the capability exposure function entity sends a network capability message carrying the current network capability information to the third party.

In Step 506, after receiving the current network capability information sent by the capability exposure function entity, the third-party APP/SP makes a service requirement/network requirement which may be met by the current network according to the current network capability, for example the information of the supported service characteristic and network performance, to enable the network to provide network service. The third-party APP/SP sends its service requirement or network requirement to the capability exposure function entity.

In Step 507, the capability exposure function entity matches the requirement with the existing network information and the underlying network information, extracts network elements meeting a requirement to form the network topology, configures the required network resource and generates dedicated networking information. The network elements meeting the requirement may be network elements not existing in an existing network, and are required to be created. A part of the network elements may also be network elements in the existing network, have relatively lighter loads, and meet the requirement on the network capability.

A Step 308 may be implemented in two alternative steps of a Step 508a and a Step 508b.

In Step 508a, the capability exposure function entity may send the dedicated networking information to the NDAS, and the NDAS forwards the dedicated networking information to an NOF entity.

In Step 508b, the capability exposure function entity sends the dedicated networking information directly to the NOF entity.

In Step 509, after receiving the dedicated networking information, the NOF entity creates at least one of the required dedicated network or dedicated network element for the third party, and allocates the required network resource.

In Step 510, after completing network creation, the NOF entity may notify a creation completion message to the capability exposure function entity. The creation completion message carries newly created network information, which includes a network identifier, a network topology, a network element identifier, a network resource and the like corresponding to at least one of the created dedicated network or dedicated network element.

In Step 511, the capability exposure function entity notifies the third party that the requirement is confirmed to be met, and simultaneously notifies description information of at least one of the created dedicated network or dedicated network element to the third party.

The third party adopts at least one of the dedicated network or the dedicated network element to implement corresponding network service and business service for a specific user to meet a differentiated requirement of the user.

As can be seen from the implementation example, the third party may acquire the network capability which may practically be supported by the current network at first through the capability exposure function entity, and the capability exposure function entity translates the network capability which may practically be supported by the current network into the data format recognizable for the third party, generates the current network capability information and returns it to the third party. The third party dynamically imports the service requirement or network requirement which may be met by the network according to the network capability of the existing network. The capability exposure function entity is required to acquire and send the network capability to the third party in advance in the implementation example, and the third party imports the requirement according to the practical network capability, so that the problem that the network side cannot meet the requirement of the third party is solved.

Six Implementation Example

Figure 11:
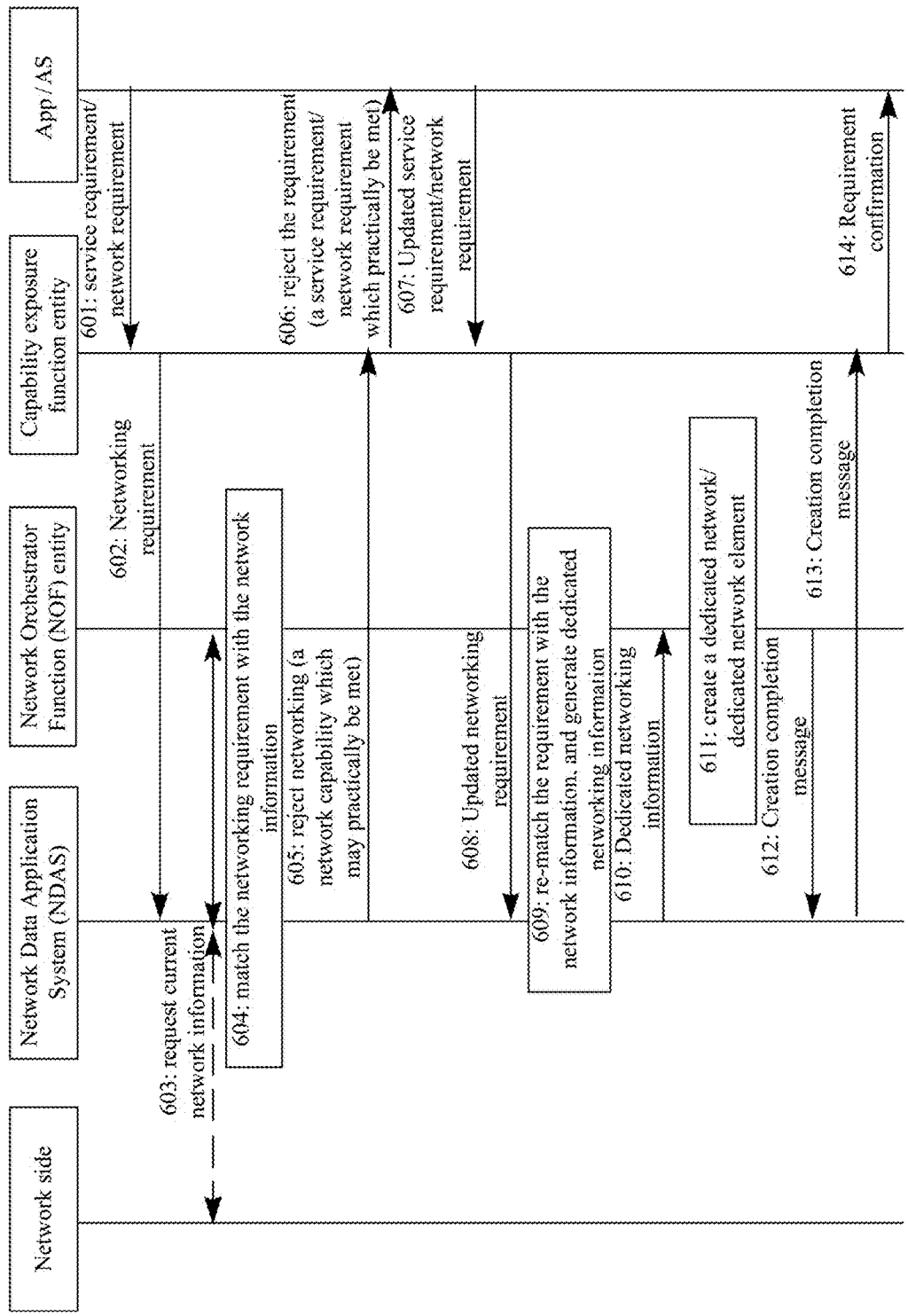
FIG. 11 is a flowchart of a capability exposure method according to a six implementation example of the disclosure.

In the embodiment, a third-party APP/SP/virtual operating company imports a requirement on a mobile network, and requests for a network resource through a capability exposure function entity, and the capability exposure function entity requests the network to provide network service for the third party. As shown in FIG. 11, the method may include the following processing steps.

In Step 601, the third-party APP/SP/virtual operating company requests a capability exposure function for a network requirement, and imports its requirement on the mobile network, including a service requirement or a network requirement. For example, the virtual operating company has a leasing requirement on a small network. An Internet of things SP requires provision of an Internet of things service such as telemedicine, smart home and remote meter reading.

In Step 602, after receiving a service request or network request of the third party, the capability exposure function entity performs protocol conversion to convert the service requirement or the network requirement into a networking requirement recognizable for a network side, and sends the networking requirement to an NDAS.

In Step 603, after receiving requested networking information from the capability exposure function, the NDAS requests an NOF entity for existing network information, including information such as performance of an existing network, a network topology relationship, composition of each network element, capabilities of the network elements and load conditions of the network elements. In case of a failure in acquisition from the NOF entity, the capability exposure function entity may directly acquire it from a network side.

In Step 604, the NDAS matches the networking requirement with the existing network information and underlying network information in the NDAS. If a network capability, for example, a service characteristic, network performance, network resource and network element function supported by the network, which may practically be supported by a current network cannot meet the networking requirement, the NDAS converts the network capability which may practically be supported by the current network into practical networking information which may be met by the network to be sent to the capability exposure function entity.

The NDAS may also interact with the NOF entity to acquire real-time network state information of the existing network, for example, a congestion condition of an existing network element and a network resource allocation condition, as a reference for matching between the requirement and the network information.

In Step 605, the NDAS sends a networking rejection message to the capability exposure function entity, and feeds back the current practical networking information to the capability exposure function entity. Therefore, the capability exposure function can conveniently request for the network resource according to the network capability which may practically be supported by the current network.

In Step 606, the capability exposure function entity converts the practical networking information into a data format recognizable for the third party to obtain service requirement/network requirement information which may be met by the existing network, sends a requirement rejection message to the third party, and feeds back the service requirement/network requirement information which may be met by the network to the third-party APP/SP.

In Step 607, after receiving the requirement rejection message of the capability exposure function entity, the third-party APP/SP regulates its service requirement/network requirement according to the service requirement/network requirement information which may be met in the requirement rejection message, and updates the imported service requirement/network requirement to enable the network to provide network service. The third-party APP/SP sends an updated requirement to the capability exposure function entity.

In Step 608, after receiving an updated service request or network request of the third party, the capability exposure function entity performs protocol conversion to convert the service requirement or the network requirement into requested networking information recognizable for the network side, and resends the networking information to the NDAS.

In Step 609, the NDAS matches the requirement with the existing network information and the underlying network information in the NDAS, extracts network elements meeting a requirement to form the network topology, configures the required network resource and generates dedicated networking information. The network elements meeting the requirement may be network elements not existing in an existing network, and are required to be created. A part of the network elements may also be network elements in the existing network, have relatively lighter loads, and meet the requirement on the network capability.

The NDAS may also interact with the NOF entity to acquire the real-time network state information of the existing network, for example, the congestion condition of the existing network element and the network resource allocation condition, as a reference for matching between the requirement and the network information. In a Step 610, the NDAS sends a network creation message carrying the dedicated networking information to the NOF entity.

In Step 611, after receiving the dedicated networking information, the NOF entity creates at least one of a required dedicated network or dedicated network element for the third party, and allocates the required network resource.

In Step 612, after completing creating at least one of the dedicated network or the dedicated network element, the NOF entity may notify a creation completion message to the NDAS. The creation completion message includes newly created network information, which includes a network identifier, a network topology, a network element identifier, a network resource and the like of at least one of the created dedicated network or dedicated network element.

In Step 613, the NDAS sends a networking completion message to the capability exposure function entity. The networking completion message carries the newly created network information, which includes the network identifier, a network topology, a network element identifier, a network resource and the like of at least one of the created dedicated network or dedicated network element.

In Step 614, the capability exposure function entity notifies the third party that the requirement is confirmed to be met, and simultaneously notifies description information to the third party, and the third party may acquire the information related to at least one of the dedicated network or the dedicated network element therefrom.

The third party adopts at least one of the dedicated network or the dedicated network element to implement corresponding network service and business service for a specific user to meet a differentiated requirement of the user.

As can be seen from the implementation example, the capability exposure function entity imports the requirement of the third party into the NDAS. The NDAS generates the dedicated networking information. The NDAS interacts with the NOF entity, and the NOF entity creates at least one of the required dedicated network or dedicated network element according to the dedicated networking information imported by the NDAS, so as to meet the service requirement or network requirement of the third party.

Obviously, those skilled in the art should know that each module or each action of the disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. Therefore, the disclosure is not limited to any specific hardware and software combination.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

An embodiment of the disclosure further discloses a computer program, which includes a program instruction, the program instruction being executed by a capability exposure function entity to enable the capability exposure function entity to execute any abovementioned capability exposure method.

An embodiment of the disclosure further discloses a carrier carrying the computer program.

After the drawings and detailed descriptions are read and understood, the other aspects may be comprehended.

Those skilled in the art should comprehend that all or part of steps of the embodiments may be implemented by virtue of a flow of a computer program, the computer program may be stored in a computer-readable storage medium, the computer program is executed on a corresponding hardware platform (for example, a system, equipment, a device and an apparatus), and during execution, one or combination thereof of the steps of the method embodiment is included.

Optionally, all or part of steps of the embodiment may also be implemented by virtue of an integrated circuit, these steps may form multiple integrated circuit modules respectively, or multiple modules or steps therein may form a single integrated circuit module for implementation. Therefore, the disclosure is not limited to any specific hardware and software combination.

Each device/function module/function unit in the embodiment may be implemented by adopting a universal computing device, and they may be concentrated on a single computing device, and may also be distributed on a network formed by multiple computing devices.

When being implemented in form of software function module and sold or used as an independent product, each device/function module/function unit in the embodiment may be stored in a computer-readable storage medium. The abovementioned computer-readable storage medium may be a read-only memory, a magnetic disk, an optical disk or the like.

Any variations or replacements apparent to those skilled in the art within the technical scope disclosed by the disclosure shall fall within the scope of protection of the disclosure. Therefore, the scope of protection of the disclosure shall be subject to the scope of protection of the claims.

INDUSTRIAL APPLICABILITY

According to the embodiments of the disclosure, a network element and a network are created for a third-party APP or an SP on the basis of a communication network architecture and a CEP. A network resource may be timely allocated, and additional service exceeding the network capability of the existing network may be provided. Therefore, when users of a small network, a dedicated network element, network leasing and the like face an emergency event or conduct a real-time business, a service requirement or network requirement of a newly added APP, a virtual operation company and the SP can be met. According to the embodiments of the disclosure, a capability exposure function imports the requirement of the third party on the mobile network. The capability exposure function interacts with the NOF entity, and sends the generated dedicated networking information to the NOF entity. The NOF entity creates the dedicated network or network element to meet the service requirement or network requirement of the third party. Therefore, virtual operation and differentiated user service requirements of the third party are met, and a user experience is effectively improved. Thus, the disclosure has very high industrial applicability.

What is claimed is:

1. A capability exposure method, comprising:
   receiving, by a capability exposure function entity, a requirement of a third party on a mobile network;
   acquiring, by the capability exposure function entity, current network information;
   creating, by the capability exposure function entity, dedicated networking information on the basis of the requirement and the current network information, wherein the dedicated networking information is adopted to instruct creation of at least one of a dedicated network or a dedicated network element; and
   sending, by the capability exposure function entity, the dedicated networking information to a Network Orchestrator Function (NOF) entity;
   the capability exposure method further comprises: before the creating, by the capability exposure function entity, the dedicated networking information on the basis of the requirement and the current network information,
   if the capability exposure function entity determines that a network capability of a current network does not meet the requirement of the third party on the mobile network according to the current network information, sending a requirement rejection message to the third party, and notifying the network capability of the current network to the third party;
   receiving, by the capability exposure function entity, a requirement updated according to the network capability of the current network, of the third party; and
   for the updated requirement, executing the creating the dedicated networking information on the basis of the requirement and the current network information.

2. The capability exposure method according to claim 1, wherein
   the current network information comprises underlying network information, or comprises the underlying network information and existing network information,
   wherein the existing network information comprises a plurality of network elements networked in an existing network and capabilities, resource utilization rates and congestion states of the plurality of network elements; and
   the underlying network information comprises a network topology of an underlying network, various network elements capable of being created in the underlying network, capabilities of the network elements, configuration information of the network elements and resource information of the underlying network.

3. The capability exposure method according to claim 2, wherein the creating, by the capability exposure function entity, the dedicated networking information on the basis of the requirement and the current network information comprises:
   matching, by the capability exposure function entity, the requirement with the underlying network information; extracting network elements of the underlying network to be used depending on the requirement, all of the network elements being newly added network elements; determining a network topology and network resources required by the newly added network elements; and generating the dedicated networking information; or,
   matching, by the capability exposure function entity, the requirement with the underlying network information; extracting network elements of the underlying network to be used depending on the requirement, a part of the network elements being network elements of the existing network and remaining part of the network elements being newly added network elements; determining a network topology and network resources required by the newly added network elements, and generating the dedicated networking information.

4. The capability exposure method according to claim 2, wherein, before the creating, by the capability exposure function entity, the dedicated networking information on the basis of the requirement and the current network information, the method further comprises:
   judging, by the capability exposure function entity, whether a network capability and performance of the existing network meet a service requirement of the third party or not according to the existing network information; and when the network capability and performance of the existing network do not meet the service requirement of the third party, executing the creating the dedicated networking information on the basis of the requirement and the current network information.

5. The capability exposure method according to claim 2, wherein the acquiring, by the capability exposure function entity, the current network information comprises:

acquiring, by the capability exposure function entity, the underlying network information from a Network Data Application System (NDAS); or, acquiring, by the capability exposure function entity, the underlying network information from the NDAS, and acquiring the existing network information from a network side or the NOF entity; or, converting, by the capability exposure function entity, the requirement of the third party into a networking requirement to be sent to the NDAS, and acquiring, by the NDAS, the existing network information from the network side or the NOF entity.

6. The capability exposure method according to claim 1, wherein the dedicated networking information comprises any one of or any combination of:

a dedicated network type, a network topology, dedicated network element information, a connecting relationship between network elements, a network resource requirement and a user type.

7. The capability exposure method according to claim 1, wherein, before the receiving, by the capability exposure function entity, the requirement of the third party on the mobile network, the method further comprises:

receiving, by the capability exposure function entity, a network capability acquisition request of the third party;

determining, by the capability exposure function entity, the network capability of the current network according to the current network information, and generating current network capability information according to the network capability of the current network; and sending, by the capability exposure function entity, a network capability message to the third party, the network capability message carrying the current network capability information.

8. The capability exposure method according to claim 1, wherein the sending, by the capability exposure function entity, the dedicated networking information to the NOF entity comprises:

sending, by the capability exposure function entity, the dedicated networking information directly to the NOF entity; or, sending, by the capability exposure function entity, the dedicated networking information to the NOF entity through the NDAS.

9. The capability exposure method according to claim 1, wherein, after the sending, by the capability exposure function entity, the dedicated networking information to the NOF entity, the method further comprises:

receiving, by the capability exposure function entity, a creation completion message from the NOF entity, wherein the creation completion message carries newly created network information, and the newly created network information comprises a network identifier, a network topology, a network element identifier and a network resource of at least one of the created dedicated network or the dedicated network element; and notifying, by the capability exposure function entity, the third party that the requirement is confirmed to be met, and notifying the newly created network information to the third party.

10. A capability exposure system, comprising a processor and a memory for storing a set of instructions executable for the processor, wherein, when the instructions are executed by the processor, the processor is arranged to:

receive a requirement of a third party on a mobile network and then acquire current network information;

create dedicated networking information on the basis of the requirement and the current network information, wherein the dedicated networking information is adopted to instruct creation of at least one of a dedicated network or a dedicated network element; and send the dedicated networking information to a Network Orchestrator Function (NOF) entity;

wherein the processor is further arranged to, before creating the dedicated networking information on the basis of the requirement and the current network information, if it is determined that a network capability of a current network does not meet the requirement of the third party on the mobile network according to the current network information, send a requirement rejection message to the third party, and notify the network capability of the current network to the third party;

receive a requirement, updated according to the network capability of the current network, of the third party; and for the updated requirement, execute the operation of creating the dedicated networking information on the basis of the requirement and the current network information.

11. The capability exposure system according to claim 10, wherein the current network information comprises underlying network information, or comprises the underlying network information and existing network information, wherein the existing network information comprises a plurality of network elements networked in an existing network and capabilities, resource utilization rates and congestion states of the plurality of network elements; and the underlying network information comprises a network topology of an underlying network, various network elements capable of being created in the underlying network, capabilities of the network elements, configuration information of the network elements and resource information of the underlying network.

12. The capability exposure system according to claim 11, wherein the processor is arranged to create the dedicated networking information on the basis of the requirement and the current network information in the following manner:

match the requirement with the underlying network information; extract network elements of the underlying network to be used depending on the requirement, all of the network elements being newly added network elements; determine a network topology and network resources required by the newly added network elements; and generate the dedicated networking information; or, match the requirement and the underlying network information; extract network elements of the underlying network to be used depending on the requirement, a part of the network elements being network elements of the existing network and remaining part of network elements being newly added network elements; determine the network topology and network resources required by the newly added network elements; and generate the dedicated networking information.

13. The capability exposure system according to claim 11, wherein the processor is further arranged to:

before creating the dedicated networking information on the basis of the requirement and the current network information, judge whether a network capability and performance of the existing network meet a service requirement of the third party or not according to the existing network information, and if the service requirement of the third party is not met, execute the operation of creating the dedicated networking information on the basis of the requirement and the current network information.

14. The capability exposure system according to claim 11, wherein the processor is arranged to acquire the current network information in the following manner:
   acquire the underlying network information from a Network Data Application System (NDAS); or,
   acquire the underlying network information from the NDAS, and acquires the existing network information from a network side or the NOF entity; or,
   convert the requirement of the third party into a networking requirement to be sent to the NDAS, and acquires, by the NDAS, the existing network information from the network side or the NOF entity.

15. The capability exposure system according to claim 10, wherein the dedicated networking information comprises any one of or any combination of:
   a dedicated network type, a network topology, dedicated network element information, a connecting relationship between network elements, a network resource requirement and a user type.

16. The capability exposure system according to claim 10, wherein the processor is further arranged to:
   before receiving the requirement of the third party on the mobile network, receive a network capability acquisition request of the third party;
   determine the network capability of the current network according to the current network information, and generate current network capability information according to the network capability of the current network; and
   send a network capability message to the third party, the network capability message carrying the current network capability information.

17. The capability exposure system according to claim 10, wherein the processor is arranged to send the dedicated networking information to the NOF entity in the following manner:
   send the dedicated networking information directly to the NOF entity; or,
   send the dedicated networking information to the NOF entity through the NDAS.

18. The capability exposure system according to claim 10, wherein the processor is further arranged to:
   after sending the dedicated networking information to the NOF entity, receive a creation completion message from the NOF entity, wherein the creation completion message carries newly created network information, and the newly created network information comprises a network identifier, a network topology, a network element identifier and a network resource of at least one of the created dedicated network or the dedicated network element; and
   notify the third party that the requirement is confirmed to be met, and notify the newly created network information to the third party.

* * * * *